United States Patent
Beauprez

(10) Patent No.: US 6,729,768 B2
(45) Date of Patent: May 4, 2004

(54) UNIT CONSISTING OF A BEARING WITH INSTRUMENT AND HOUSING JOINED BY A COUPLING PIECE

(75) Inventor: Jean-Michel Beauprez, Menthonnex Sous Clermont (FR)

(73) Assignee: The Torrington Company, Torrington, CT (US)

(*) Notice: Subject to any disclaimer, the term of this patent is extended or adjusted under 35 U.S.C. 154(b) by 70 days.

(21) Appl. No.: 10/137,920

(22) Filed: May 2, 2002

(65) Prior Publication Data

US 2002/0181814 A1 Dec. 5, 2002

(30) Foreign Application Priority Data

May 4, 2001 (FR) .............................. 01 06020

(51) Int. Cl.[7] .............................................. F16C 19/06
(52) U.S. Cl. .................................... 384/448; 384/537
(58) Field of Search .............................. 384/448, 537, 384/446, 544, 585

(56) References Cited

U.S. PATENT DOCUMENTS 5,564,838 A    10/1996   Caillault et al. ............ 384/448
5,585,560 A    12/1996   Goossens ..................... 73/494
5,942,891 A    8/1999    Miyazaki et al. ........... 324/173

FOREIGN PATENT DOCUMENTS

EP           0 164 447        3/1988

*Primary Examiner*—Lenard A. Footland
(74) *Attorney, Agent, or Firm*—Michael Best & Friedrich LLP

(57) ABSTRACT

A unit consisting of a bearing equipped with a data sensor device and a housing in which the bearing is coupled. The bearing consists of an inner turning collar designed to be attached to a turning body, an outer fixed collar coupled to the housing, and rolling bodies positioned between them. The data sensor device consists of a coder that generates magnetic impulses attached to the turning collar and, attached to the fixed collar, a sensor equipped with at least two sensitive components capable of detecting such impulses. The housing is designed to permit said bearing to be locked radially and to lock the bearing axially in one direction. The unit further consists of a coupling piece for the bearing inside the housing configured such that the bearing is locked at least in the other direction.

16 Claims, 3 Drawing Sheets

UNIT CONSISTING OF A BEARING WITH INSTRUMENT AND HOUSING JOINED BY A COUPLING PIECE

BACKGROUND

The invention concerns a unit consisting of a bearing equipped with a data sensor device and a housing inside which the bearing is coupled.

Such units permit, on the one hand, a turning body to rotate by attaching it to a turning collar and, on the other hand, the bearing and the body to be locked in position in relation to the housing.

The invention likewise concerns a steering system for an automobile consisting of a steering column coupled to the inner collar of such a unit and a steering tube in which the housing is formed to receive said column in rotation.

In such units, when the bearing is equipped with a device to detect rotating speed, angular position, and/or the rotating direction of the turning collar in relation to the fixed collar, the data may be converted into signals as a function of the torque exerted on the column by means of the steering wheel, with these signals being used by a power steering computer.

In another example of an application, such units are used for automobile vehicle wheels that are equipped with anti-lock systems; the data are then used, in particular, by a power brake computer.

Bearings equipped with a data sensor device consisting of a coder that generates magnetic impulses attached to the turning collar and a sensor equipped with at least two sensitive components capable of detecting such impulses attached to the fixed collar are already known.

In addition, document U.S. Pat. No. 5,927,867 speaks of an attachment device consisting of a casing provided with projections, with said casing being coupled to the outer collar of the bearing with the projections fitting into a groove provided in the housing. In one mode of embodiment, the casing carries the sensor.

This mode of embodiment presents a number of disadvantages.

In particular, it does not allow for the bearing to be attached securely enough inside the housing. In fact, the attachment is achieved merely by a housing seat that receives all of the stresses exerted by the bearing.

Furthermore, because the sensor is attached to the casing, which is capable of moving particularly in rotation under the effect of the stresses exerted on it, this mode of embodiment does not ensure precise positioning of the sensor in relation to the coder.

Also, particularly for safety applications such as anti-lock brakes or power steering, the sensor must be precisely and securely joined to the bearing in order for the sensitive components to be always opposite and at a distance from the coder.

SUMMARY

The present invention provides a unit in which, on the one hand, the bearing is securely fixed inside the housing and, on the other, the sensitive components of the sensor are precisely and securely positioned to be opposite and at a distance from the coder.

To that end, and according to a first feature, the invention proposes a unit consisting of a bearing equipped with a data sensor device and a housing in which said bearing is coupled, in which:

said bearing consists of an inner turning collar designed to be attached to a turning body, an outer fixed collar coupled to the housing, and rolling bodies positioned between them;

said data sensor device consists of a coder that generates magnetic impulses attached to the turning collar and, attached to the fixed collar, a sensor equipped with at least two sensitive components capable of detecting such impulses;

said housing is designed to permit said bearing to be locked radially;

said housing has a first means to lock the bearing axially in one direction;

with said unit further consisting of a coupling piece for the bearing inside the housing, with said piece being provided with a combination of the following:

a mutual axial locking device for the sensor and the fixed collar;

a second means to lock the bearing, with this second means being designed to work with the additional means provided in the housing to ensure that the bearing is locked at least in the other direction.

According to a second feature, the invention proposes an automobile steering system consisting of a steering column coupled to the inner collar of such a unit and a steering tube that receives said column in rotation, in which the housing is formed in the tube.

Other purposes and advantages of the invention will be revealed in the description that follows, made with reference to the attached drawings.

DETAILED DESCRIPTION OF THE PREFERRED EMBODIMENTS

Figure 1:
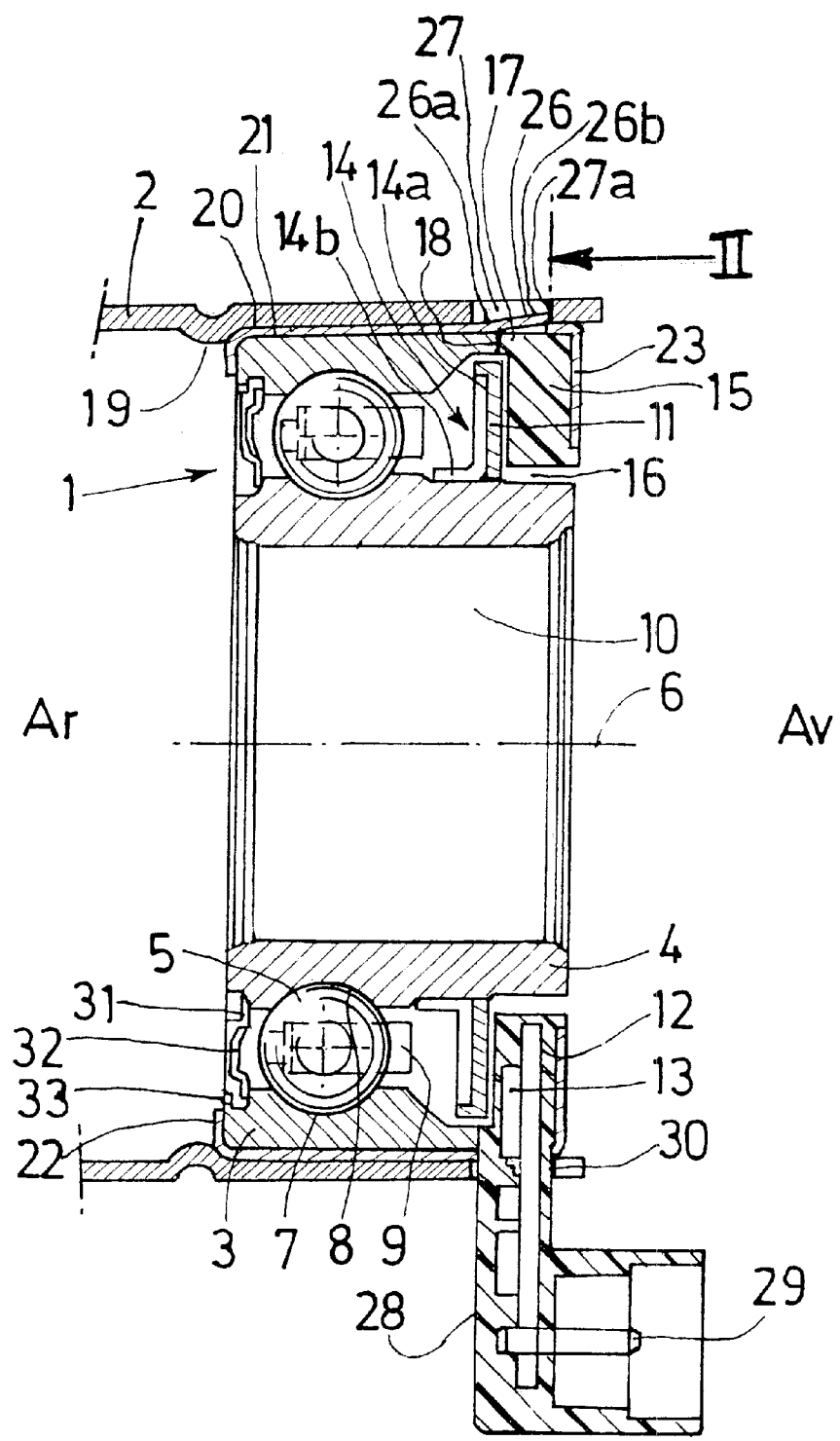
FIG. 1 is a lengthwise cross section of a first mode of embodiment of the unit according to the invention.
Figure 2:
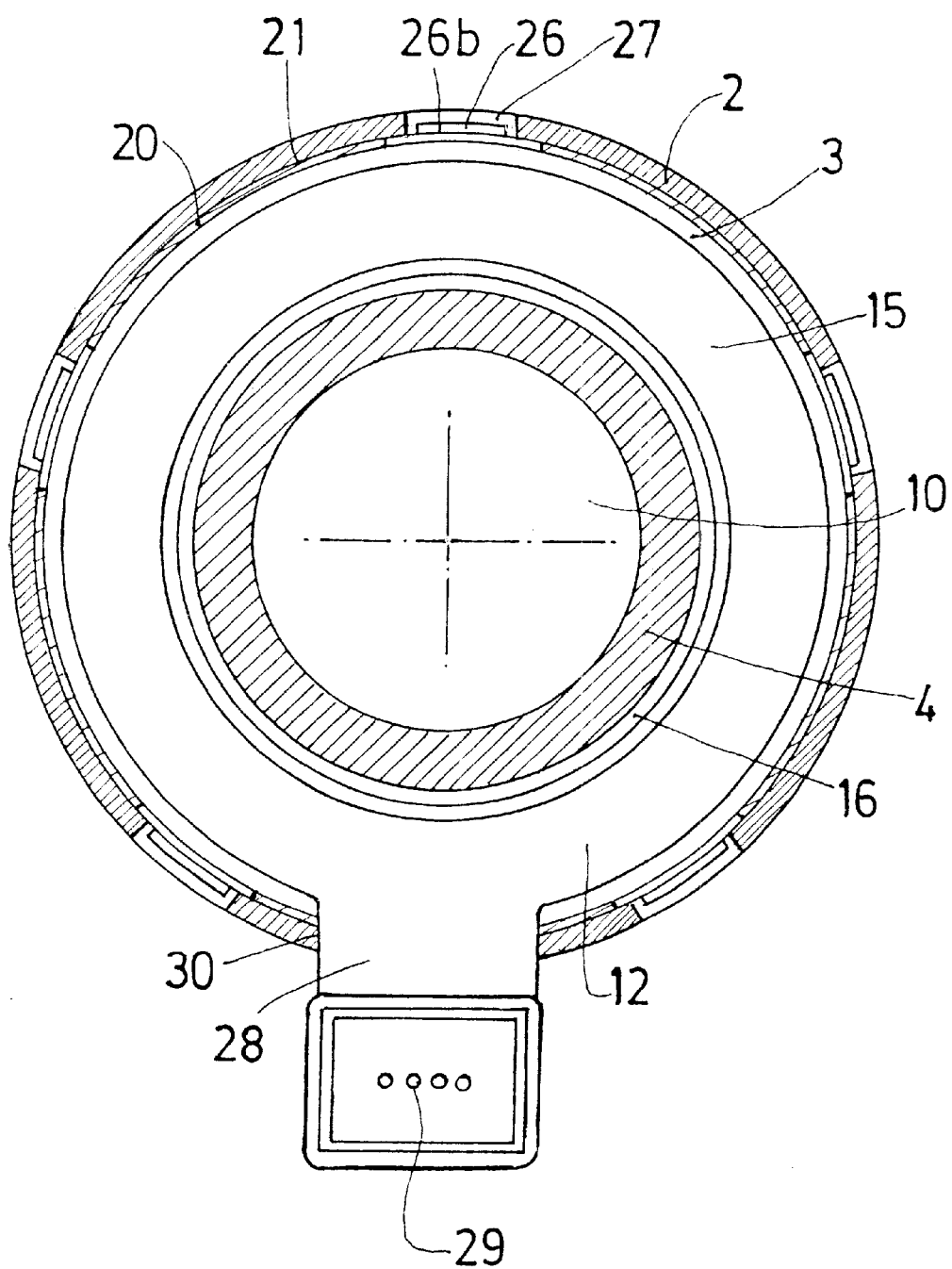
FIG. 2 is a front view in partial cross section along II of the unit illustrated in FIG. 1.
Figure 3:
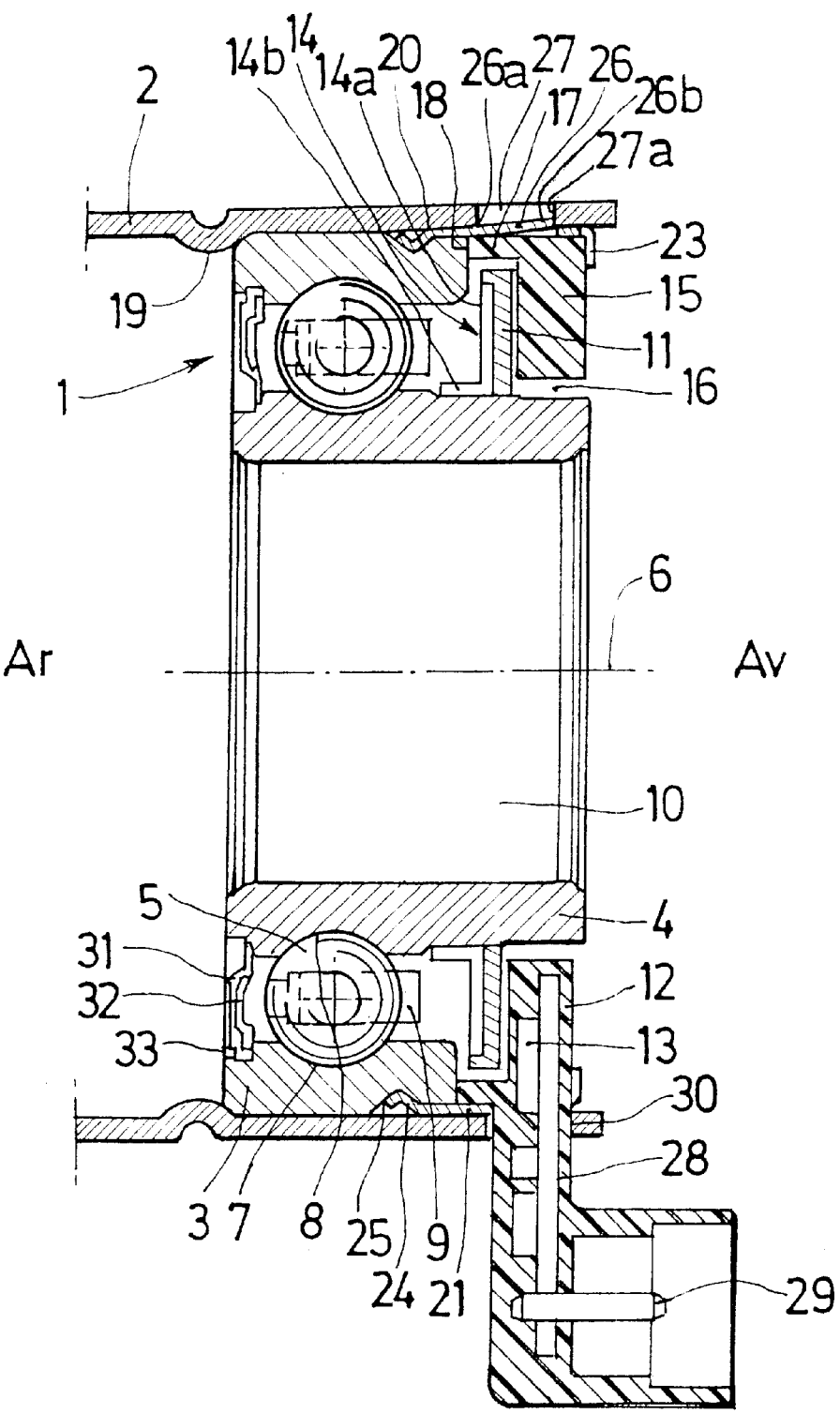
FIG. 3 is a lengthwise cross section of a second mode of embodiment of the unit according to the invention.

In FIGS. 1 to 3, a unit is illustrated which consists of bearing 1 equipped with a data sensor device and housing 2 inside which said bearing 1 is coupled so as to be attached.

Bearing 1 consists of fixed outer collar 3 coupled to housing 2, turning inner collar 4, and rolling bodies 5 positioned between them in order to permit the relative rotation of said collars 4, 5 around axis 6.

Coupling is understood to mean that bearing 1 is forcibly inserted into housing 2 with the upper surface of fixed collar 3 attached to the inner surface of housing 2.

In the description, the terms "outer" and "inner" are defined in relation to a plane that is, respectively, opposite and facing axis 6; the terms "axial" and "crosswise" are defined in relation to a plane parallel to axis 6; the terms "radial" or "lateral" are defined in relation to a plane perpendicular to axis 6; the terms "front" and "rear" are defined in relation to references Av and Ar indicated in the figures; and dimensions measured along axis 6 or perpendicular to it are referred to, respectively, as "axial" or "radial."

In the illustrated modes of embodiment, bearing path 7, 8 is traveled, respectively, on the inner surface of collar 3 and the outer surface of turning collar 4, with the bearing being provided by a set of balls 5 that are maintained equidistant by means of casing 9.

Such bearings 1 are, for example, used to ensure rotation of a steering column or of the wheels of an automobile. To that end, inner collar 4 has opening 10 designed to house the steering column or the wheel hub.

When one wishes to know the speed of rotation, direction of movement, and/or angular position of turning collar 4 in relation to fixed collar 3, it is a known technique to use a data sensor device consisting of coder 11 that generates magnetic impulses and is attached to turning collar 4 and, attached to fixed collar 3, sensor 12 equipped with at least two sensitive components 13 capable of detecting the impulses.

This type of data, after electronic processing of the type described, for example, in document FR-2 792 380, is conventionally used in driving assistance systems such as power steering or anti-lock brake systems.

In a specific example, coder 11 consists of a multipolar ring of synthetic material doped with ferrite particles consisting of a number of contiguous fields in which the magnetism of a given field is inverted in relation to the two fields contiguous to it.

In the illustrated modes of embodiment, coder 11 is cast into the working mold for annular and radial cylindrical seat 14a of frame 14. Frame 14 also consists of annular and axial cylindrical seat 14b that is attached by being coupled, for example, to the outer surface of inner collar 4. This mode of embodiment permits the joint rotation of coder 11 and inner collar 4.

In a specific example, sensor 12 consists of at least two sensitive components 13 and a number of aligned sensitive components, for example, which are chosen from among Hall-effect sensors, magnetic resistances, and giant magnetic resistances. According to a known method, such components are capable of detecting the magnetic impulses generated by coder 11 in order to provide signals that are, for example, representative of the speed of rotation, direction of movement, and/or angular position of turning collar 4 in relation to fixed collar 3.

In the modes of embodiment illustrated in the figures, sensor 12 is composed of ring 15 that is concentric to bearing 1, along with opening 16 provided in ring 15 so that it does not interfere with the rotation of turning collar 4.

Ring 15 includes peripheral extension 17 that extends radially backward and is long enough so that when it rests against front lateral surface 18 of fixed collar 3, it permits sensitive components 13 to be positioned opposite and at a distance from coder 11.

To that end, front lateral surface 18 has no special tooling to permit sensor 12 with sensitive components 13 to be held or positioned at a distance from coder 11.

In a specific example, sensor 12 is made in monoblock construction by casting a plastic material, for example, with sensitive components 13 placed in the mass of ring 15.

In the illustrated modes of embodiment, housing 2 is cylindrical, with an inner diameter that is roughly equal to the outer diameter of outer collar 3 in order to permit bearing 1 to be coupled and radially locked inside housing 2.

In a specific example, housing 2 is formed in the steering tube so as to constitute an integral part of it, with bearing 1 permitting a steering column to be axially and radially locked as well to rotate inside said tube.

To that end, housing 2 may be made of a section of tube or in a section of tube, by tooling or deformation of the tube, for example.

Housing 2 has first means to axially check the bearing in one direction, which consist of shoulder 19 whose inner diameter is less than the outer diameter of outer collar 3.

Therefore, when bearing 1 is inserted into housing 2 from the front, the bearing abuts axially against shoulder 19, thereby locking it toward the back.

The unit further includes coupling piece 20 for bearing 1 inside housing 2, with said piece being designed more or less not to limit the length of the coupling seat.

This mode of embodiment ensures, on the one hand, that bearing 1 is locked in housing 2, and on the other hand that piece 20 is locked in relation to housing 2 and to bearing 1.

In the modes of embodiment illustrated in the figures, the coupling piece consists of sheath 20, for example, made of a metal material by bulk tooling or from a tube, which includes cylindrical coupling seat 21 that extends over at least part of the outer crosswise surfaces of sensor 12 and of fixed collar 3.

In addition, sheath 20 is provided with mutual axial locking device for sensor 12 and fixed collar 3, designed to permit them to be assembled together. Thus, sheath 20 is locked in position by means of its coupling seat 21, and the position of sensor 12 opposite and at a distance from coder 11 is achieved precisely and securely.

To that end, the locking device consists of front locking means and back locking means, which are provided on either side of said seat 21, respectively, to secure sensor 12 and outer collar 3. The distance between the respective front and rear locking means is designed to permit there to be contact but no play between peripheral extension 17 as it rests against front lateral surface 18 of fixed collar 3.

This mode of embodiment ensures the precise positioning of sensitive components 13 at a distance from coder 11, by preventing any movement of sensor 12 relative to outer collar 3 and accordingly to coder 11.

In addition, the two axial locking means constitute, on the one hand, mechanical stops; on the other hand, because they are provided on coupling piece 20, the connection between sensor 12 and outer collar 3 is made very secure.

In the first mode of embodiment illustrated in FIGS. 1 and 2, seat 21 runs the entire axial length of the outer crosswise surfaces of sensor 12 and of outer collar 3, and the respective front and rear locking means rest against at least part of the respective front and rear lateral surfaces of sensor 12 and of outer collar 3.

The rear locking means include radial shoulder 22 and the front locking means are consisted of a number of hooks 23 engaged radially against the front surface of ring 15, with said hooks 23 being distributed around the periphery of sheath 20.

However, other modes of embodiment are conceivable, using identical front and rear locking means, for example.

Shoulder 22 may be formed by plastic deformation or by tooling one end of sheath 20; after bearing 1 and sensor 12 have been placed inside sheath 20, hooks 23 are then bent down to axially lock sensor 12 in relation to outer collar 3.

Thus, before or after bearing 1 is coupled into housing 2, bearing 1 and sensor 12 are assembled with sensitive components 13 positioned opposite and at a distance from coder 11.

In the second mode of embodiment illustrated in FIG. 3, seat 21 extends over part of the outer crosswise surface of outer collar 2 [sic] and over the entire axial length of the outer crosswise surface of sensor 12, with the locking device further consisting of a means to receive the rear locking means.

In this mode of embodiment, the rear locking means consist of annular shoulder 24 and the receiving means consist of annular hollow part 25 cut into the outer crosswise surface of outer collar 3 so as to receive said shoulder 24.

In this mode of embodiment, sensor 12 and outer collar 3 are assembled by radially locking coupled sheath 20, thereby joining shoulder 24 and hollow part 25. In addition, the stresses exerted by the front locking means on sensor 12 are limited by the fact that the rear locking means also act to lock bearing 1 in both directions.

As in the first mode of embodiment, the front locking means may consist of radial shoulder 22 and/or a number of hooks 23 radially engaged over at least part of the front lateral surface of sensor 12.

In the two illustrated modes of embodiment, coupling piece 20 is provided with a second means to lock bearing 1, with said second means being designed to work together with the additional means provided in housing 2 to ensure that bearing 1 is locked at least toward the front.

The second locking means consist of a number of elastic tabs 26 regularly distributed near the front edge of coupling piece 20. The tabs are cut and shaped so that they are attached to piece 20 by their rear edge 26a, and so that their front end 26b projects radially outward from the surface of said piece 20.

Thus, tabs 26 are capable of being pressed back more or less along the plane of piece 20 in order to permit bearing 1 to be coupled into housing 2, and then to redeploy radially due to the elasticity of the material used to make piece 20.

In the illustrated modes of embodiment, the additional means consist of hollow parts 27 designed to receive said respective radially deployed tabs 26, with said hollow parts 27 being regularly distributed in housing 2. Thus, axial locking between front end 26b of a tab 26 and rear lateral surface 27a of a hollow part 27, combined with the presence of the locking device, permits bearing 1 to be locked toward the front inside housing 2.

When bearing 1 is inserted into housing 2, tabs 26 come into contact with the inner surface of housing 2, which causes them to bend back radially and thereby permit insertion; then, when tabs 26 are opposite hollow parts 27, they deploy to ensure that bearing 1 is locked axially.

To that end, the distance between shoulder 19 and hollow parts 27 is designed to axially lock bearing 1 without any play.

In addition, the respective widths of tabs 26 and hollow parts 27 may be more or less equal to ensure that bearing 1 is prevented from rotating inside housing 2.

In one mode of embodiment not illustrated, the additional means consist of an annular groove cut into the inside surface of housing 2 so as to receive said radially deployed tabs 26 and permit the front end of the tabs to lock axially with the rear lateral surface of the groove.

According to these two modes of embodiment, the coupling of bearing 1 into housing 2 is practically irreversible since any backward movement of bearing 1 is checked.

In the illustrated modes of embodiment, sensor 12 includes radial housing 28 designed to receive input/output interfacing 29 of sensor 12, in the form of a connector or multifiber cable, for example.

Housing 2 accordingly includes axial cut 30, the size of which is designed to receive radial housing 28 to ensure that bearing 1 is prevented from rotating inside housing 2.

In addition, this mode of embodiment makes it possible to orient the insertion of bearing 1 inside housing 2 by positioning tabs 26 opposite hollow parts 27.

Therefore, by means of secure fixing and a single piece 20 with a simple construction, the unit according to the invention ensures, on the one hand, that bearing 1 is locked axially and radially and is prevented from rotating inside housing 2 and, on the other hand, that sensor 12 is so connected to bearing 1 that sensitive components 13 are opposite and at a distance from coder 11.

In the modes of embodiment illustrated in the figures, bearing 1 is made watertight at its back surface by means of elastomer lip 31 that abuts against inner collar 4. To do so, lip 31 is cast onto the working mold of frame 32, and attached, for example, by clipping into groove 33 provided on the inner surface of outer collar 3.

The front surface is made watertight due to the relative positioning of frame 14 and ring 15. In fact, they form a baffle that prevents bearing 1 from being polluted and that prevents lubricant leaks. In particular, sensor 12 protects coder 11 by covering its entire periphery in order to prevent the entry of pollutants.

However, other watertight means may be provided, such as casings 9 including axial extensions that cover the collars and that act as deflectors or, particularly for bearings for alternating movements, the use of a solid lubricant of the type described in document FR-2 760 055.

In addition, in order to improve watertightness on the front side, a watertight lip of the kind described above may be used to cover seat 14a on frame 14.

What is claimed is:

1. A unit consisting of a bearing equipped with a data sensor device and a housing in which said bearing is coupled, in which:

said bearing consists of an inner turning collar designed to be attached to a turning body, an outer fixed collar coupled to the housing, and rolling bodies positioned between them;

said data sensor device consists of a coder that generates magnetic impulses attached to the turning collar and, attached to the fixed collar, a sensor equipped with at least two sensitive components capable of detecting such impulses;

said housing is designed to permit said bearing to be locked radially;

said housing has a first means to axially lock the bearing in one direction;

with said unit further consisting of a coupling piece for the bearing inside the housing, and with said piece being provided with a combination of the following:

a mutual axial locking device for the sensor and the fixed collar;

second means to lock the bearing, with this second means being designed to work with the additional means provided in the housing to ensure that the bearing is locked in at least the other direction.

2. A unit according to claim 1, characterized in that the coupling piece consists of a sheath to assemble the sensor to the outer collar, with said sheath consisting of a cylindrical coupling seat that extends at least over part of the outer crosswise surfaces of the sensor and the fixed collar.

3. A unit according to claim 2, characterized in that the locking device includes a front locking means and rear locking means provided on either side of said seat, respectively, to secure the sensor and the outer collar.

4. A unit according to claim 3, characterized in that the seat runs the entire axial length of the outer crosswise surfaces of the sensor and of the outer collar, with the respective front and rear locking means resting against at least part of the front and rear lateral surfaces, respectively, of the sensor and of the outer collar.

5. A unit according to claim 4, characterized in that the locking means consist of a radial shoulder and/or a number of hooks engaged radially.

6. A unit according to claim 3, characterized in that the seat extends over part of the outer crosswise surface of the outer collar and over the entire axial length of the outer crosswise surface of the sensor, with the locking device further consisting of a means to receive the rear locking means.

7. A unit according to claim 6, characterized in that:

the rear locking means consist of an annular shoulder;

the receiving means consist of an annular hollow part cut into the outer crosswise surface of the outer collar so as to receive said shoulder; and the front locking means consist of a radial shoulder and/or a number of hooks radially engaged over at least part of the front lateral surface of the sensor.

8. A unit according to claim 1, characterized in that the second locking means consist of a number of elastic tabs that are cut into coupling piece with their front end projecting radially outward from the surface of said piece, with said tabs being capable of bending back so as to be more or less in the plane of the piece in order to permit the bearing to be coupled into the housing, then to radially redeploy due to the elasticity of the material used to make the piece.

9. A unit according to claim 8, characterized in that the additional means consist of hollow parts provided to receive the respective radially deployed tabs, so as to permit axial locking between the front end of a tab and the rear lateral surface of a hollow part.

10. A unit according to claim 9, characterized in that the respective widths of the tabs and hollow parts are more or less equal to ensure that the bearing is prevented from rotating inside the housing.

11. A unit according to claim 8, characterized in that the additional means consist of an annular groove cut into the inner surface of the housing to receive said radially deployed tabs and to provide an axial lock between the front end of the tabs and the rear lateral surface of the groove.

12. A unit according to claim 1, characterized in that the sensor is constructed in monoblock form with the sensitive components positioned opposite and at a distance from the coder, with the input/output interfacing of the sensor being placed in a radial housing.

13. A unit according to claim 12, characterized in that the housing consists of an axial cut the size of which is designed to receive the radial housing, thereby preventing the bearing from rotating inside the housing.

14. A unit according to claim 1, characterized in that the sensitive components are chosen from among Hall-effect sensors, magnetic resistances, and giant magnetic resistances.

15. A unit according to claim 1, characterized in that the coder consists of a multipolar ring of a synthetic material doped with ferrite particles forming a number of contiguous fields in which the magnetism of a given field is inverted in relation to the two fields contiguous to it.

16. An automobile steering system consisting of a steering column coupled to the inner collar of a unit according to claim 1 and a steering tube receiving said column in rotation, with said system being characterized in that the housing is formed in the tube.

* * * * *